United States Patent
Chaney et al.

(10) Patent No.: US 6,597,505 B1
(45) Date of Patent: Jul. 22, 2003

(54) APPARATUS FOR PRODUCING AND GUIDING A LIGHT BEAM

(75) Inventors: Raymond J Chaney, Berkeley (GB); Mark A V Chapman, Wotton-under-Edge (GB); Tingdi Liao, Wotton-under-Edge (GB); Jan Linnenbuerger, Charfield (GB); Damon M Northeast, Wotton-under-Edge (GB)

(73) Assignee: Renishaw PLC (GB)

( * ) Notice: Subject to any disclaimer, the term of this patent is extended or adjusted under 35 U.S.C. 154(b) by 0 days.

(21) Appl. No.: 09/700,198
(22) PCT Filed: Mar. 22, 2000
(86) PCT No.: PCT/GB00/01080
§ 371 (c)(1),
(2), (4) Date: Nov. 13, 2000
(87) PCT Pub. No.: WO00/57228
PCT Pub. Date: Sep. 28, 2000

(30) Foreign Application Priority Data

Mar. 23, 1999 (GB) .............................................. 9906494

(51) Int. Cl.$^7$ ................................................. G02B 5/30
(52) U.S. Cl. ...................... 359/494; 356/338; 356/345; 356/349; 356/351; 356/358; 356/363
(58) Field of Search .......................... 359/494; 356/351, 356/345, 363, 358, 349, 338

(56) References Cited

U.S. PATENT DOCUMENTS

| 4,221,460 A | 9/1980 | Hepner et al. |
| 4,615,034 A * | 9/1986 | von Gunten et al. ......... 372/99 |
| 4,824,251 A | 4/1989 | Slotwinski et al. |
| 5,648,848 A * | 7/1997 | Aiyer .......................... 356/351 |
| 5,689,367 A | 11/1997 | Pan et al. |
| 5,751,423 A * | 5/1998 | Traina et al. ................ 356/338 |

FOREIGN PATENT DOCUMENTS

DE 0 415 407 A2 * 6/1991

* cited by examiner

Primary Examiner—Audrey Chang
Assistant Examiner—Craig Curtis
(74) Attorney, Agent, or Firm—Oliff & Berridge, PLC

(57) ABSTRACT

Apparatus for producing and guiding a light beam, in particular for a laser interferometer, includes a laser having a laser tube (100) and an external cavity (112). Two laser beams (110A' and 110B') of orthogonal polarization states are directed from the cavity into polarization maintaining fibers (12, 14). The two beams are generated from a single beam (110) by a birefringent prism (120) in the cavity. Additional beam steering prisms (130A and 130B) are included to direct the beams from the birefringent prism to the fibers. The additional steering prisms compensate for temperature induced beam deviations in the birefringent prisms. Interferometric sensing heads (20, 22) receive the beams from the fibers and include a rotatable wedge prism and mechanical adjustment means for guiding the beams onto reflecting surfaces on an object for positioning the object. The ends of the fibers attached to the sensing heads are kinematically located in the head.

12 Claims, 5 Drawing Sheets

APPARATUS FOR PRODUCING AND GUIDING A LIGHT BEAM

The present invention relates to apparatus for producing and guiding a light beam, and relates in particular to a laser and to a sensing head which may be used, for example, in a laser interferometer to measure displacement of an object.

The use of laser interferometer apparatus for measuring displacement is well known. Typically, a laser beam is split into two parts, one of which is directed along a fixed reference path, and the other of which is directed towards an object whose displacement is to be measured. Reflected beams from the fixed reference path and the object are recombined to generate an interference beam whose instantaneous intensity varies with displacement of the object being measured. By monitoring a cyclic variation in the intensity of the interference beam, an incremental count corresponding to displacement of the object relative to some reference position, or datum, may be generated.

It is known to employ such apparatus in order to determine the displacement of a stage which is movable in two mutually orthogonal directions, known as an XY stage.

In such apparatus two laser beams are required to enable two laser interferometers to be used to measure displacements of the stage in two orthogonal directions.

In one apparatus, currently marketed by Hewlett-Packard Corporation, it is known to derive the two laser beams from a single beam output by a laser, by placing one or more beamsplitters in the path of the laser beam to direct different portions of the beam to different parts of the apparatus.

An object of the present invention is to provide a laser which outputs two beams directly.

It is known however from U.S. Pat. No. 5,648,848 to provide a laser comprising a laser tube for generating a laser beam, and a cavity external to the laser tube which receives, at an input end thereof, the beam from the laser, tube wherein two fibre optic cables are provided each of which has an end attached to an output face of the cavity, and an optical system is positioned in the cavity to receive the laser beam, said optical system comprising a birefringent prism which produces from the laser beam two beam parts which are directed into said ends of the fibre optic cables.

One problem associated with such a laser is that the angle of deviation of a laser beam passing through the optical system can vary with changes in temperature.

According to a novel aspect of the invention, the optical system in the cavity comprises two further beam steering prisms which direct the beam parts from the birefringent prism onto the ends of the fibre optic cables.

By this means any deviations in the angles of the beam parts produced by the birefringent prism which are caused by temperature variations in the laser cavity, can be removed by the beam steering prisms which are subjected to the same temperature variations. It is preferable that the three prisms are identical.

The laser is preferably a gas laser which includes a thermally controlled laser tube to which the cavity is attached.

In a preferred embodiment of the invention, the laser tube produces a laser beam which has two orthogonal polarisation states, the birefringent prism splits the laser beam into its two polarisation states and the fibre optic cables which receive the two beam parts are made from polarisation maintaining fibres.

An embodiment of the present invention will now be described, by way of example, and with reference to the accompanying drawings, in which.

Figure 1:
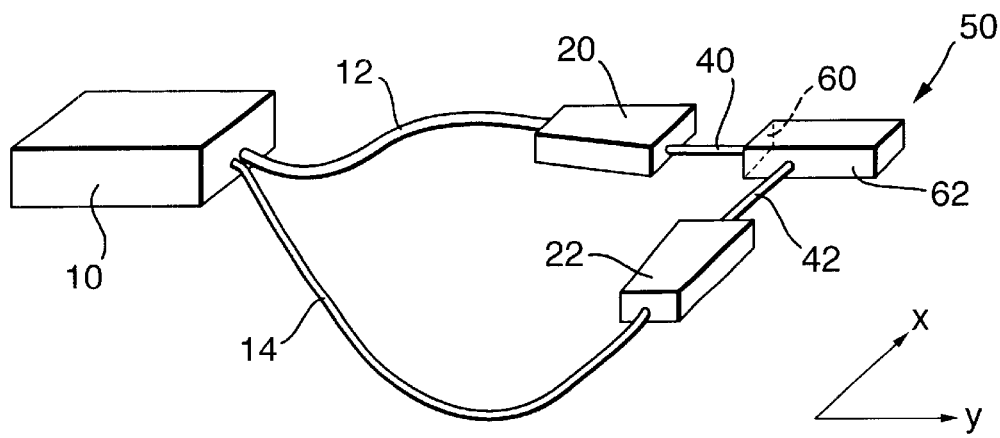
FIG. 1 is a perspective view of an interferometric, measuring apparatus incorporating a laser and a remote sensing head according to different aspects of the present invention.

Referring now to FIG. 1, a laser interferometer measuring apparatus includes a laser head 10 which emits a pair of laser beams which, in this example, have orthogonal polarisation states and different frequencies. The laser beams are directed along polarisation maintaining optical fibres 12,14 to remote sensing heads 20,22 respectively. The remote sensing heads 20,22 effectively measure displacement of an object 50 in mutually orthogonal directions defined by respective pairs of output beams 40,42, which are incident upon plane mirrors 60,62 mounted to the object 50. Each of the sensing heads generates an electrical output from which an incremental count indicative of displacement of the object 50 in the X and Y directions may be determined.

Figure 2A:
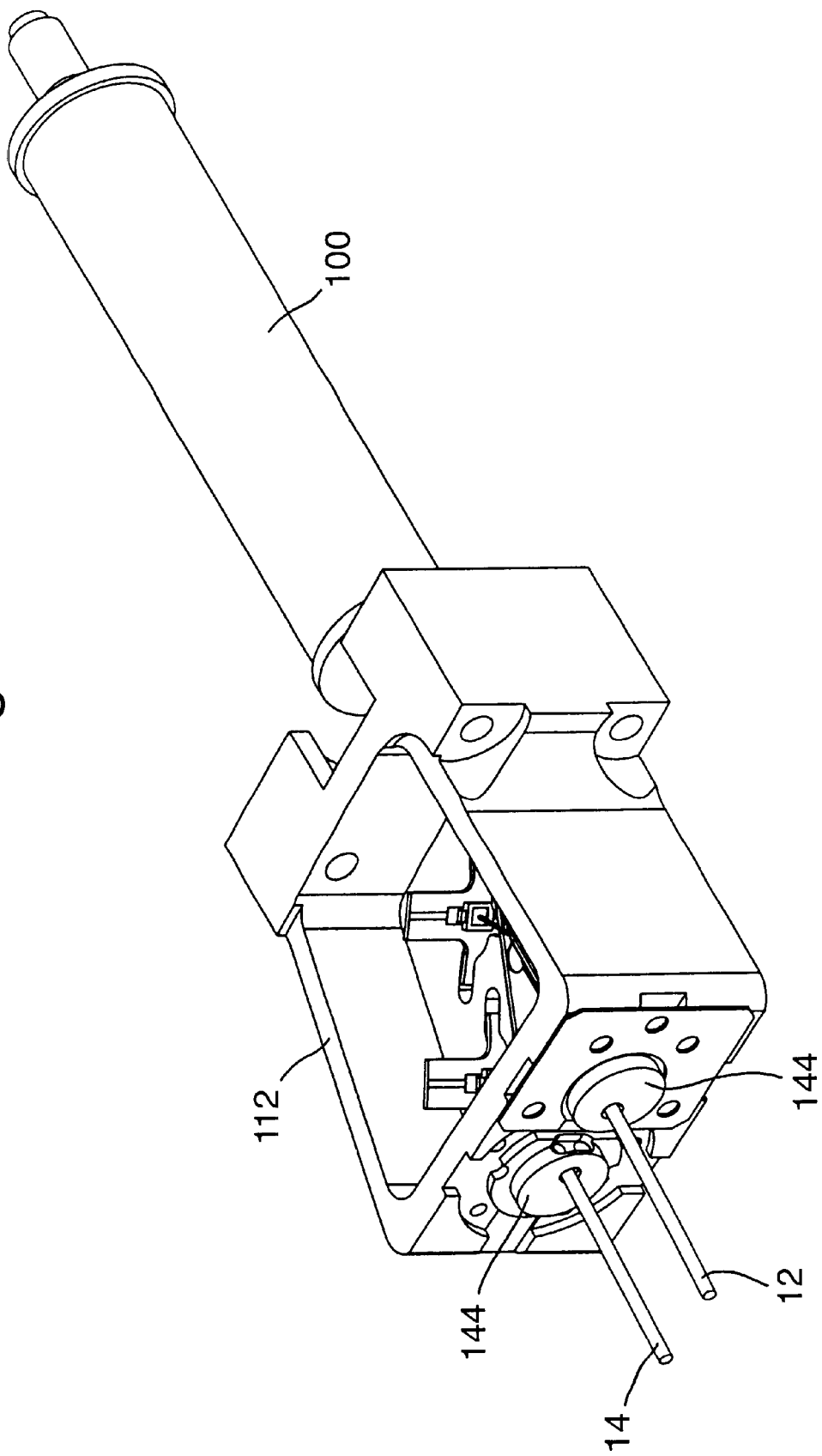
FIGS. 2a and 2b are respectively a perspective view and a plan view of the laser of FIG. 1.
Figure 2B:
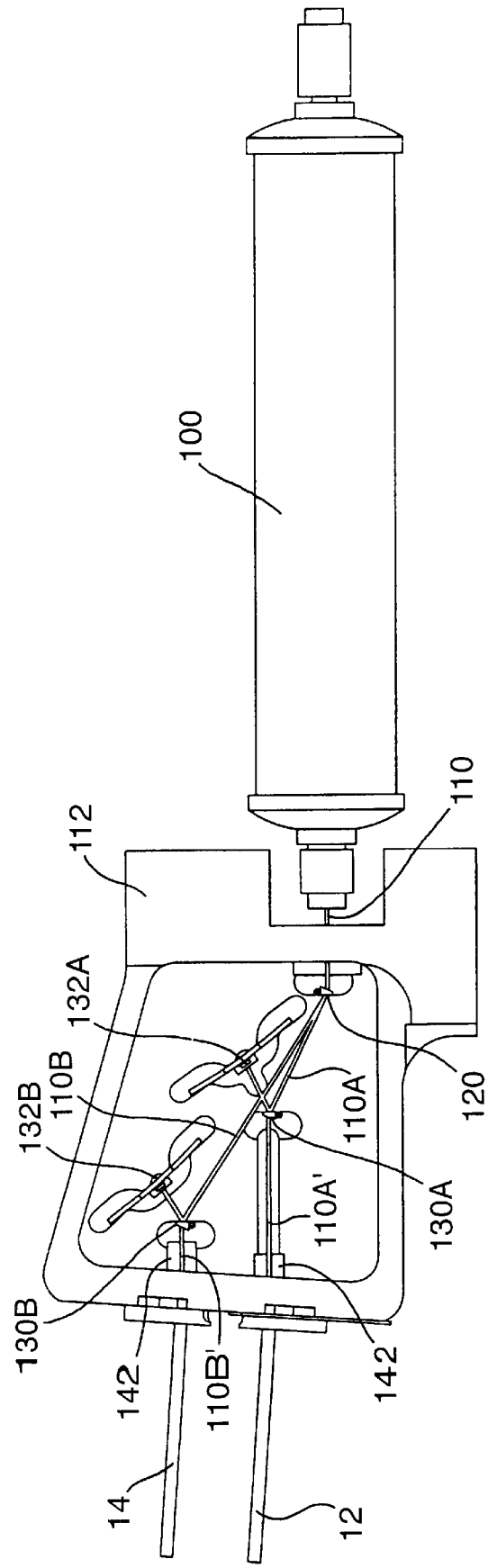

Referring now to FIGS. 2a and 2b, there is shown an external cavity laser which includes a laser tube 100 which emits a beam 110 of laser light into an external cavity 112. Upon entering the cavity 112, the beam 110 is incident upon a birefringent prism 120 which splits the beam 110 into component beams 110A and 110B of differing polarisation states, which are to be directed into the polarisation maintaining optical fibres 12 and 14. Variations in temperature will affect the angles at which the two component beams 110A and 110B emerge from the birefringent prism 120. Because of the tight tolerances on the angles at which the beams must enter the fibres 12 and 14, the effects of temperature changes need to be compensated.

One method of achieving the required compensation would be to control the temperature of the laser cavity but the present invention deals with the problem in a novel way.

Temperature compensation is achieved in accordance with one aspect of the invention by the use of two additional beam steering prisms 130A and 130B positioned to direct the beams from the birefringent prism towards the ends of the fibres. The prisms 130A and 130B provide deviations in the beam paths due to temperature variations which are equal and opposite to those produced by the birefringent prism 120.

The fractions 110A' and 110B' of the beams 110A and 110B respectively which are transmitted through the steering prisms 130 emerge in a direction which, in this example, is substantially parallel to the beam 110 from the laser tube, and are subsequently directed into the polarisation maintaining optical fibres 12,14 respectively, via lenses (not shown) preferably with anti-reflective coatings.

The proximal ends of the fibres 12,14 are retained in connectors 142, which are in turn mounted to portions of a plate 144, the attitudes of which are independently adjustable within the housing in order to ensure that the axis of the fibre is correctly aligned with the axis of polarisation of the respective light beam. End faces of the fibres 12,14 are either cleaved, polished, and/or coated with an anti-reflective coating to prevent Fresnel reflected or scattered light from destabilising the frequency stability of the laser.

In this example, the incident faces of the prisms 130A and 130B are slightly reflective such that a small fraction of each of the beams 110A and B is reflected therefrom onto an individual photodetector 132A and 132B respectively. The outputs of photodetectors 132A,132B are used to provide information enabling the laser tube to be frequency stabilised to the requisite degree of precision in a manner well-known per se, for example, by energising a heater coil (not shown) around the laser tube. Clearly the beam fractions required for stabilisation of the frequencies of the laser beams could be taken from other faces of the prisms.

Alternatively, stabilisation of the laser frequency could be performed using light emitted from the rear face of the laser tube.

Figure 3:
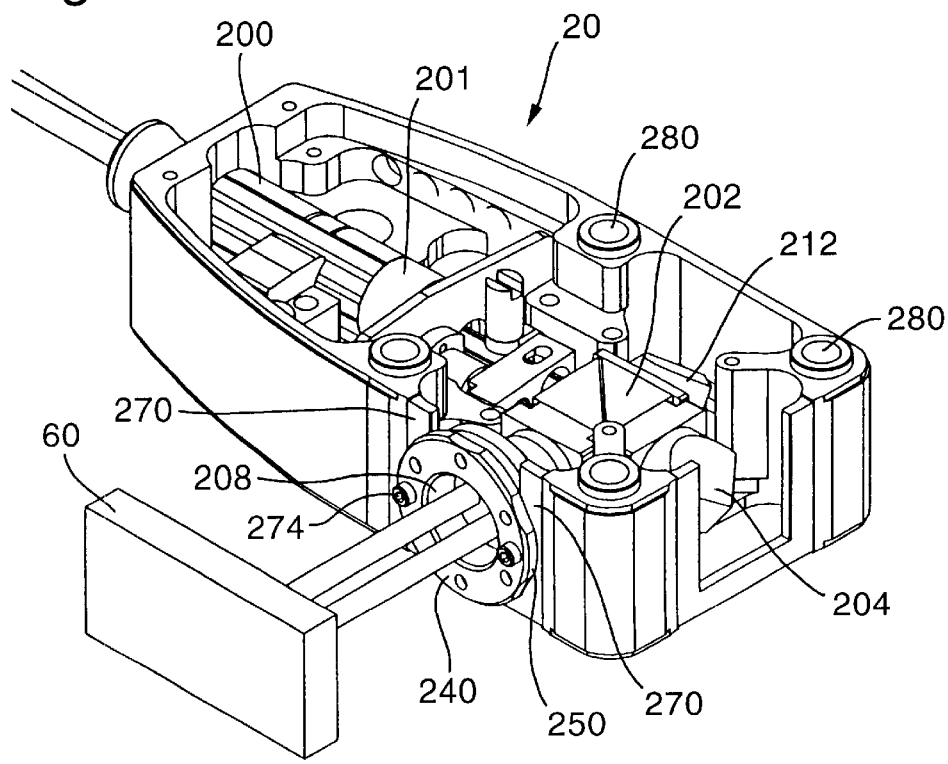
FIG. 3 is a perspective view of a remote sensing head of FIG. 1 showing the optical components inside.
Figure 4:
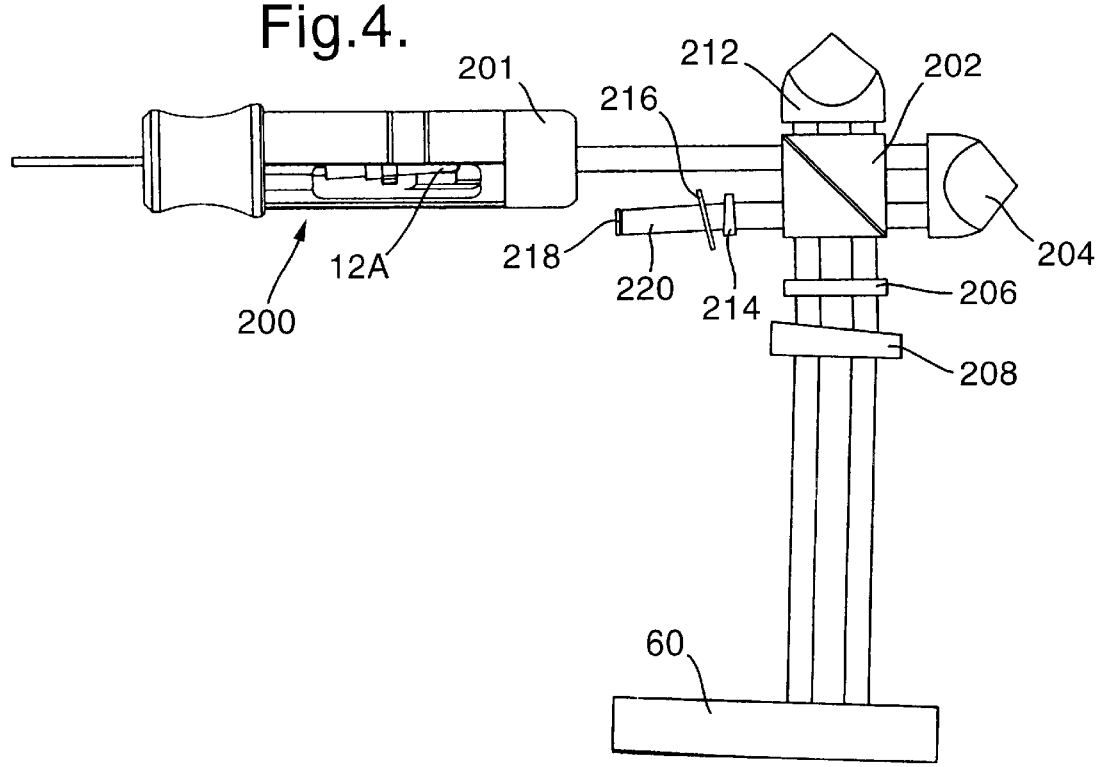
FIG. 4 is a view of the main optical components of the sensing head of FIG. 3.
Figure 5B:
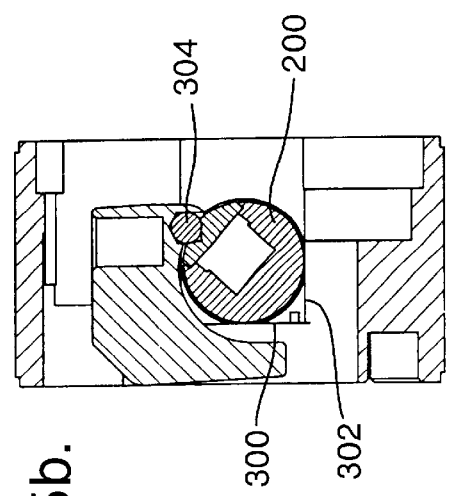
FIGS. 5a and 5b are respectively a plan and cross-section of the sensing head of FIG. 4 showing a detail of the cable attachment.
Figure 5A:
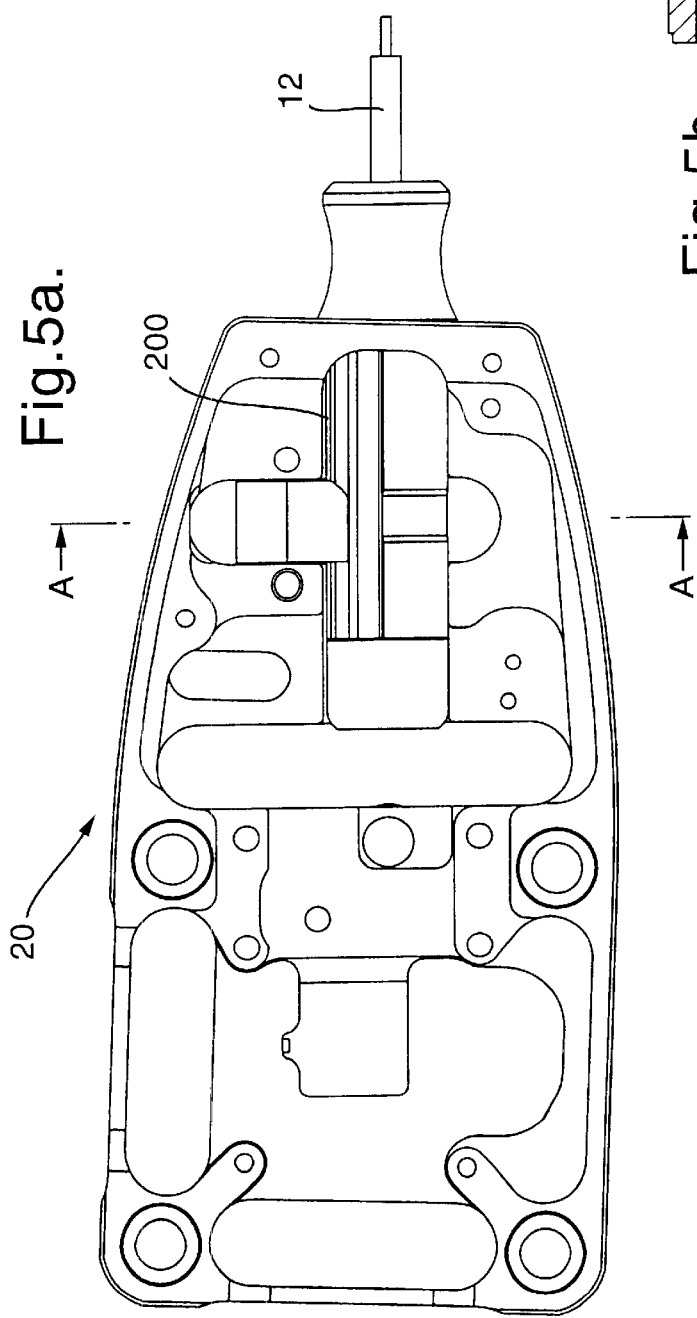

Referring now to FIGS. 3 and 4 a sensing head 20 is shown connected at the opposite end of one of the fibre optic cables 12 by means of a connector barrel 200 mounted kinematically in the sensing head (see FIGS. 5a and 5b). Light emitted from the output end of the fibre 12 is collimated by means of a lens 201, and is subsequently incident upon a polarising cubic beamsplitter 202. The axis of polarisation of the light is aligned at 45° relative to the polarisation axis of the beamsplitter 202, so that half the light is transmitted through the beamsplitter 202 into a reference retroreflector 204, (which in this example is a corner cube retroreflector, but could be a plane mirror). The position of the reference retroreflector 204 is fixed relative to the beamsplitter 202 and therefore forms a reference arm. The remaining half of the light is reflected by the beamsplitter 202 (see FIG. 4) through a quarter waveplate 206, and steering prism 208 onto the plane mirror 60, connected to the object the position of which is being measured. The mirror 60 reflects the light substantially back along its path.

Having passed twice through quarter waveplate 206, the polarisation of the beam has now been rotated through 90° so that it is transmitted through the beamsplitter 202, and passes into a further retroreflector 212. The retroreflector 212 reflects the light once again through beamsplitter 202, quarter waveplate 206 and beam steering prism 208 onto the plane mirror 60, which once again reflects the beam back into the beamsplitter. Having passed once again through the quarter waveplate 206 on two occasions, the beam reflected at plane mirror 60 is now reflected at the beamsplitter 202, and combines with the reflected beam from retroreflector 204 to form an interference beam 220.

In accordance with another independent novel aspect of the invention, the interference beam 220 passes through a birefringent wedge prism 214, which refracts the beam reflected from the plane mirror 60 and the beam reflected from reference retroreflector 204 to different extents, as a result of their differing polarisations. Both of these beams then pass through a polaroid 216, the axis of which extends at 45° to the directions of polarisation of each of the beams forming the interference beam 220, thereby to mix their polarisation states and cause genuine interference. Because the beams are non-parallel, a spatial fringe pattern will result, and this is incident upon a detector array 218.

The detector which may be substantially of the type disclosed in our prior published patent application U.S. Pat. No. 5,302,820 produces a series of cyclically modulating phase-shifted electrical signals during motion of the plane mirror 60 away from and toward the beamsplitter 202. Such a detector includes a plurality of elongate photosensitive elements spaced commensurate with the spatial fringe pattern. In order to finely tune the spread of the fringe pattern to the spacing of the detector elements, the detector array may be mounted for angular movement relative to the fringe pattern, or the birefringent prism may be mounted for rotation relative to the detector.

Because the different frequency beams from the laser are distinct, the readings transmitted back from the interference signals derived from each beam may be converted to common metrological units, even though the fringe pitches are different.

In an alternative embodiment a ¼ waveplate could be included between the end of the fibre 12 and the beamsplitter 202, to generate substantially circularly polarised light incident on the beamsplitter 202.

The reference and measurement arms of the interferometer are preferably locally thermally balanced to ensure uniform changes in dimensions with a change in temperature, so that the fringe count is independent of the temperature of the sensing head.

Other forms of detector may be used. For example in a modification of the present embodiment, a remote detector unit (as described in our U.S. Pat. No. 4,996,416) could be used. In an example of such a system the reference and measurement beams would be passed through a quarter waveplate, oriented at 45° to produce a linearly polarised output beam, the polarisation angle of which is dependent upon the phase difference between the measurement and reference arm beams. This interference beam is split into at least two further beams, and is then passed through polarising elements arranged at 45° with respect to each other, such that the light intensity of the subsequent output beams are in a quadrature relationship. These beams are then focussed separately into multimode fibres and are transmitted along the fibres into the laser head where photodetectors are located, for converting these sine and cosine optical signals into electrical signals, where they may be locally processed or transmitted to a machine tool controller, for example. In a further modification, the optical fibres may be taken directly to the machine tool controller, where the optical signals are transduced into electrical signals recognisable by the controller.

In still another modification to the embodiments described above, instead of having a remote laser and connecting it to the sensing head by means of fibre optic cables to provide the light source for the head, the laser may be mounted directly in the sensing head.

Figure 6:
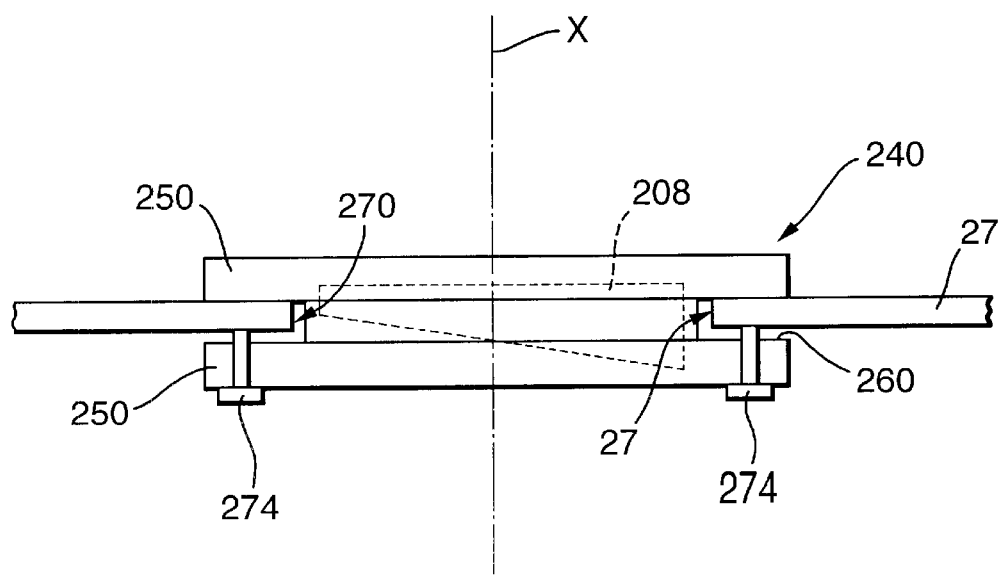
FIG. 6 shows detail of the beam steering prism of FIG. 3.

In order to ensure ease of alignment, in accordance with another independent novel aspect of the invention the steering prism 208 is mounted in a rotatable bracket 240 the attitude of which may be adjusted relative to the housing, in a manner illustrated in FIG. 6.

Referring also now to FIG. 6, the beam steering prism 208 is fixedly retained within the bracket 240, typically by gluing. The bracket 240 is substantially circular, and has a pair of circumferentially extending flanges 250 creating a circumferentially extending slot 260, which is engaged by the jaws 270 provided by an aperture in the housing of the remote sensing head. A pair of bolts 274 project through the outer flange 250 and bear against the jaws 270 of the housing. Rotation of the bracket 240, and thus the prism 208 about an axis X, (FIG. 6), causes the light beam to deflect along a substantially conical path. In the present example the bracket 240 is permitted to rotate through a limited angular range of virtue of mechanical stops (not shown), such that the pitch of the light beam about the X axis is varied. Rotation of the bracket is permitted by loosening of the bolts 274.

To enable relatively fine adjustment of the pitch from a relatively coarse rotation of the bracket 240, and thus prism 208, the prism 208 is aligned such that when at the mid-point of its permitted adjustment range its plane of symmetry extends substantially horizontal, i.e. parallel to the X axis.

Adjustment of the yaw i.e. rotational displacement of the beam about axis Z orthogonal to the X axis is performed by means of a corresponding bodily rotation of the remote sensing head. This is enabled by virtue of a generous clearance between the bolts 280 (see FIG. 3) which secure the sensing head to the platform upon which it is to be used, and the housing.

To ensure accurate re-alignment of the fibre optic cable 12 in the sensing head 20, the connector barrel 200 is kinematically located in the head (FIGS. 5a and 5b). This is achieved, in this example, by providing orthogonal flat surfaces 300,302 on a fixed part of the head on which the cylindrical surface of the barrel seats. A ball 304 is urged by a spring or screw (not shown) into a conical recess in the opposite surface of the barrel thus preventing any translations or rotations of the barrel.

What is claimed is:

1. Apparatus for producing and guiding a light beam, comprising:

a laser for generating a laser beam, and a cavity external to the laser which receives, at an input end thereof, the beam from the laser, wherein two fibre optic cables are provided each of which has an end attached to an output face of the cavity, and an optical system is positioned in the cavity to receive the laser beam, said optical system including a birefringent prism which produces from the laser beam two beam parts which are directed towards two further beam steering prisms for directing the two beam parts onto the ends of the fibre optic cables.

2. Apparatus according to claim 1 wherein the beam steering prisms are made from the same material as the birefringent prism whereby any deviations in the angles of the beams passing through the birefringent prism due to temperature variations are compensated by the beam steering prisms.

3. Apparatus according to claim 1, wherein the laser produces a beam which has two orthogonal polarisation states, each of the beams produced by the birefringent prism being polarized in one of the two states, and the fibre optic cables into which the beams are directed are made from polarisation maintaining fibres.

4. Apparatus according to claim 1 wherein the laser is stabilised using beams taken from the two beam steering prisms.

5. Apparatus for producing and guiding a light beam, comprising:

a light source for producing a light beam, a head for directing a portion of the light beam towards an object, means for mounting the head on a base in a position relative to the object, wherein the head includes a rotatable wedge prism through which the light beam is directed towards the object and rotation of which varies the direction of the beam in a first plane, and the mounting means includes adjustment means for adjusting the orientation of the head to vary the direction of beam in a second plane orthogonal to the first plane.

6. Apparatus according to claim 5, wherein the head is a sensing head and includes an interferometer which generates said portion of the light beam and a reference beam and receives a beam reflected from the object, the interferometer producing from the reflected beam and the reference beam an interference beam, and a detector system which derives measurement data from the interference beam.

7. Apparatus according to claim 5, wherein the light source is a laser mounted within the head.

8. Apparatus according to claim 5, wherein the light source is a remote laser which is connected to the head by at least one fibre optic link.

9. Apparatus according to claim 6 wherein the detector system includes:

a birefringent prism which receives the interference beam and produces therefrom two beams, a polaroid which receives the two beams and produces a spatial interference fringe pattern, and a detector having spaced detecting elements which receive the spatial interference pattern.

10. Apparatus according to claim 9 wherein the birefringent prism and the detector are relatively angularly adjustable to enable the spacing of the fringes in the spatial interference fringe pattern to coincide with the spacing of the detecting elements of the detector.

11. Apparatus according to claim 8, wherein the fibre optic link from the remote laser, terminates at the head in a housing which is mounted kinematically within the sensing head.

12. Apparatus for producing and guiding a light beam, comprising:

a light source for producing a light beam;

a head for directing a portion of the light beam towards an object, the head including an interferometer which generates said portion of the light beam and a reference beam and receives a beam reflected from the object, the interferometer producing from the reflected beam and the reference beam an interference beam; and a detector system which derives measurement data from the interference beam, the detector system including:

a birefringent prism which receives the interference beam and produces therefrom two beams, a polaroid which receives the two beams and produces a spatial interference fringe pattern, and a detector having spaced detecting elements which receive the spatial interference pattern, wherein the detector and the birefringent prism are relatively angularly adjustable to enable the spacing of the fringes in the spatial interference fringe pattern to coincide with the spacing of the detecting elements of the detector.

* * * * *